United States Patent

[11] 3,632,402

| [72] | Inventors | Klaus Weissermel<br>Kelkheim/Taunus;<br>Rudolf Kern, Mainz, both of Germany |
|---|---|---|
| [21] | Appl. No. | 817,545 |
| [22] | Filed | Apr. 18, 1969 |
| [45] | Patented | Jan. 4, 1972 |
| [73] | Assignee | Farbwerke Hoechst Aktiengesellschaft<br>vormals Meister Lucius & Bruning<br>Frankfurt am Main, Germany |
| [32] | Priority | Apr. 23, 1968 |
| [33] | | Germany |
| [31] | | P 17 69 224.9 |

[54] THERMOPLASTIC MOLDING COMPOSITIONS ON THE BASIS OF SATURATED POLYESTERS
12 Claims, No Drawings

[52] U.S. Cl............................................... 117/100 C,
117/138.8 F, 117/168
[51] Int. Cl........................................ B32b 27/06,
B32b 27/36
[50] Field of Search........................... 117/100 C,
168, 138.8 F, 121; 260/37 EP, 835, 28; 264/142, 109

[56] References Cited
UNITED STATES PATENTS

| 2,779,745 | 1/1957 | Howland...................... | 117/100 X |
|---|---|---|---|
| 2,962,469 | 11/1960 | Phillips et al. ................. | 260/835 |
| 3,180,750 | 4/1965 | Shippee et al. ................ | 260/28 |
| 3,245,817 | 4/1966 | Lovness........................ | 117/168 X |
| 3,405,102 | 10/1968 | Kugler........................... | 260/37 X |
| 3,461,088 | 4/1969 | Stahnecker et al. .......... | 117/100 X |
| 3,461,092 | 8/1969 | Story............................. | 117/100 X |
| 3,193,601 | 7/1965 | Billingsley.................... | 264/142 |

FOREIGN PATENTS

| 847,059 | 9/1960 | Great Britain................ | 117/100 |

*Primary Examiner*—William D. Martin
*Assistant Examiner*—Mathew R. P. Perrone
*Attorney*—Curtis, Morris & Safford

ABSTRACT: Process for the manufacture of thermoplastic molding compositions on the basis of saturated linear polyesters wherein the polyester granules containing inert inorganic solids and polyfunctional epoxides are coated with a neutral or partially neutralized salt of a montan wax or a montan wax ester.

THERMOPLASTIC MOLDING COMPOSITIONS ON THE BASIS OF SATURATED POLYESTERS

The present invention relates to thermoplastic molding compositions on the basis of saturated polyesters, which molding compositions have improved properties.

It has been proposed to produce shaped articles from thermoplastic molding compositions comprising saturated linear polyesters of aromatic dicarboxylic acids. It has also been proposed to add to polyethylene terephthalate finely divided solid inorganic substances as nucleating agents to increase the speed of crystallization of the injection molded polyester in the mold. By this step the crystallinity and the density of the injection molded articles are increased and therewith the dimensional stability and stability of shape at elevated temperature are improved. As solid inorganic substances there have been proposed, for example, metal oxides, alkaline earth metal salts, talc powder, glass powder, or metals. The inorganic substances should have a particle size of less than 2 microns.

It has likewise been proposed further to increase the speed of crystallization by adding to the polyesters a mixture of the inorganic nucleating agents with specific epoxides.

It has now been found that rapidly crystallizing molding compositions on the basis of saturated linear polyesters, which molding compositions are stable to degradation when being processed and prepared by mixing the polyester with a. 0.05 to 3 percent by weight, preferably 0.6 to 1.0 percent by weight, calculated on the polyester, of inert inorganic solids having a particle size below 5 microns and b. 0 to 2 percent by weight, preferably 0.05 to 0.3 percent by weight calculated on the polyester, of polyfunctional epoxides of the general formula

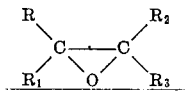

in which R, $R_1$, $R_2$, and $R_3$ stand for hydrogen, alkyl, cycloalkyl, aryl or aralkyl groups which may be linked to one another with formation of ring structures and may contain ether or ester groupings, in each case at least one of the substituents carrying a further epoxide grouping, melting the mixture, extruding the melt and granulating, subsequently drying the granules until the moisture content has dropped below 0.01 percent by weight and after-condensing the polyester composition until the reduced specific viscosity is at least 1.4 dl./g., measured with a 1 percent solution in a 60:40 mixture of phenol and tetrachloroethane at 25° C., can be obtained when the granules prepared in this manner are subsequently coated with c. 0.01 to 1 percent by weight, preferably 0.05 to 0.5 by weight, more preferably 0.15 to 0.25 percent by weight, calculated on the polyester, of a montan wax salt, a salt of a montan wax ester or a montan acid partially neutralized with 0.1 to 0.9, preferably 0.2 to 0.75 equivalent of alkali metal hydroxide or alkali metal oxide.

By adding montanates according to the invention after granulation together with inorganic nucleating agents, drying and after-condensation, the injection cycle can be considerably shortened and the rate of production increases without the utilitarian properties of the polyester being detrimentally affected.

In this manner polyester molding compositions are obtained which crystallize more rapidly and exhibit a low degree of degradation during injection molding so that the good mechanical properties of high molecular polyesters, such as the impact strength, are fully maintained.

It is known from British Pat. No. 847,059 to incorporate pigments into polyesters in the presence of metal soaps, for example lead montanate. With the simultaneous addition of pigment and montanate during polycondensation, described in the said patent, the speed of crystallization is, however, not increased as results from comparative example 1a. Surprisingly, the desired increase of the speed of crystallization depends on the order of addition of the components.

As polyester, polyethylene terephthalate is used in the first place. Other suitable polyesters are, for example polycyclohexane-1,4-dimethylol terephthalate or polyesters containing as acid component, in addition to terephthalic acid, up to 5 mole percent of other aromatic or aliphatic dicarboxylic acids, such as isophthalic acid, naphthalene-2,6-dicarboxylic acid or adipic acid, or as alcoholic component, in addition to ethylene glycol, up to 30 mole percent of other aliphatic diols, such as 2,2-dimethylpropane-diol-(1,3) or butane-diol-(1,4), or up to 1 percent of tetrols, for example 1,1,4,4-tetramethylolcyclohexane. Polyesters of hydroxy-carboxylic acids may also be used. The polyesters should have a reduced specific viscosity of from 0.6 to 2.0 dl./g., preferably 0.9 to 1.6 dl./g., measured with a 1 percent polymer solution in a 60:40 mixture of phenol and tetrachloroethane at 25° C. Especially good results are obtained with polyesters having a reduced specific viscosity of from 1.1 to 1.5 dl./g.

Suitable inorganic nucleating agents are alkaline earth metal carbonates, for example calcium-magnesium carbonate, and oxides such as titanium dioxide or aluminum oxides, as well as talc and aluminum silicates and preferably sodium aluminum silicates.

Montan acid is an acid mixture essentially consisting of aliphatic monocarboxylic acids having 26 to 32 carbon atoms in the chain. Suitable salts of montan wax contain as cation Li, Na, and K, sodium montanates being preferred.

Suitable polyfunctional epoxides are, for example, alkylene-polyol-glycidyl ethers or butane-diol-(1,4) diglycidyl ether.

The inorganic nucleating agent can be added to the finished polyester granules or during the manufacture of the polyester prior to or during the polycondensation. It is preferably mixed with the finished polyester, for example by subjecting the mixture of nucleating agent and polyester granules to rotation in a drum. If desired, the epoxide may be added simultaneously. The coated granules are homogenized, for example in an extruder, and the mixture again granulated. The montanates are added to the polyester granules containing the nucleating agent after drying after-condensation.

The montanates according to the invention bring about not only a more rapid crystallization of the shaped articles in the mold, but simultaneously protect the granules against the absorption of moisture. In order to obtain unobjectionable injection molded articles the polyester composition should contain as little moisture as possible, preferably less than 0.01 percent by weight.

In order to bring about crystallization in the mold the mold must be maintained at a temperature of at least 110° C. A rapid crystallization and therewith short injection cycles are obtained with mold temperatures in the range of from 120° to 150° C., preferably of from 135° to 145° C.

Tests were carried out using the injection mold for a program control dial of a washing machine wherein the dial was pressed out of the mold by very sharp ejector pins. The injection cycle was defined after which the ejector pins did just not penetrate into the finished mold articles and the article fell from the mold almost by itself.

The following examples serve to illustrate the invention but they are not intended to limit it thereto, the percentages are percent by weight, calculated on the polyethylene terephthalate.

EXAMPLE 1

Granules of polyethylene terephthalate having a moisture content below 0.01 percent by weight and a reduced specific viscosity of 1.40 dl./g., measured with a 1 percent solution in a 60:40 mixture of phenol and tetrachloroethane at 25° C. were subjected to rotation for 1 hour with 0.6 percent of calcium-magnesium carbonate. The coated granules were melted at 275° C. in an extruder and homogenized, the melt was extruded into water in the form of a wire and granulated. The moisture content of the granules was again reduced to a value below 0.01 percent and the granules were heated for 6 to 8 hours at 240° C. under a pressure of 0.4 mm. of mercury until the reduced specific viscosity was 1.40 dl./g. Next, the granules were coated with 0.2 percent by weight of sodium montanate having a flow point of 178° C.

With the granules obtained program control dials having a diameter of about 10 cm. were injection molded at a cylinder temperature of 265° C. and a temperature of the mold of 140° C. The total injection cycle was 90 seconds. The residence time in the mold was adjusted in such a manner that when the mold was opened the ejector pins did no longer penetrate into the molded article. The injection molded articles had excellent surface properties, they had slight flashes and a density of 1.375 g./cc. When, instead of sodium montanate an unbranched paraffin having a flow point of 114° to 118° C. was used, the injection cycle must be prolonged to 160 seconds. The surface of the injection molded articles was then a little ondulated, they had slight flashes and the density was also 1.375 g./cc.

EXAMPLE 1a (comparative example)

Polyethylene terephthalate was prepared under the usual conditions of polycondensation with the addition of 0.6 percent of calcium-magnesium carbonate and 0.2 percent of sodium montanate.

A colorless polyester was obtained having a reduced specific viscosity of 0.88 dl./g., measured with a 1 percent solution in a 60:40 mixture of phenol and tetrachloroethane at 25° C.

The polyester granules were dried for 6 hours at 180° C. under reduced pressure in an eccentric tumbling drier and then subjected to after-condensation in the solid phase for 6 hours at 240° C. under a pressure of 0.4 mm. of mercury. The after-condensed polyester had a reduced specific viscosity of 1.45 dl./g.

With the granules program control dials having a diameter of 10 cm. were injection molded at a cylinder temperature of 265° C. and a temperature of the mold of 140° C. It was only after a total cycle of 240 seconds that the dials could be removed from the mold without greater difficulty. Even after such a long time in the mold the ejector pins slightly penetrated into the molded article. The surface of the injection molded articles was strongly corrugated and distorted. The articles showed slight flash formation and had a density of 1.360 g./cc.

Although the same additives as in example 1 had been added, the speed of crystallization was so slow that it was not possible to transform the granules into injection molded articles within an economically tolerable period of time.

EXAMPLE 2

Granules of polyethylene terephthalate having a moisture content below 0.01 percent and a reduced specific viscosity of 1.4 dl./g. were subjected to rotation for 1 hour with 0.6 percent of powdery aluminum silicate (75 percent of the particles having a diameter of less than 2 microns) and 0.1 percent of butane-diol diglycidyl ether.

The coated granules were homogenized in an extruder at a temperature of 275° C., extruded into water in the form of a wire, and granulated. The granules were dried until the moisture content had dropped below 0.01 percent, heated for 7 to 8 hours at 240° C. under a pressure of 0.4 mm. of mercury until the specific viscosity was again 1.4 dl./g. and coated with 0.2 percent of sodium montanate (flow point 178° C.).

With the granules program control dials having a diameter of about 10 cm. were injection molded at a cylinder temperature of 265° C. and a temperature of the mold of 140° C. The total injection cycle was 55 seconds. The residence time in the mold was chosen in such a manner that the ejector pins did not penetrate into the article when the mold was opened. The injection molded articles had excellent surface properties, they were free from flashes and had a density of 1.376 g./cc.

When instead of sodium montanate an unbranched paraffin having a flow point of from 114° to 118° was added, the injection cycle had to be prolonged to 100 seconds. The molded articles obtained in this manner did not have an absolutely smooth surface, they were free from flashes and had a density of 1.376 g./cc.

EXAMPLE 3

Granules of polyethylene terephthalate having a content of 0.1 percent of pentaerythritol, calculated on the dimethylolterephthalate used, a moisture content of less than 0.01 percent and a reduced specific viscosity of 1.40 dl./g. were subjected to rotation for 1 hour together with 0.6 percent of talc. The coated granules were homogenized in an extruder at a temperature of 275° C., the molten composition was extruded into water in the form of a wire and granulated. Next, the granules were dried until the moisture content had dropped below 0.01 percent and heated for 7 to 8 hours at 240° C. under a pressure of 0.4 mm. of mercury until the reduced specific viscosity was 1.4 dl./g. Finally the granules were coated with 0.25 percent of lithium montanate (flow point 198° C.).

With the granules program control dials having a diameter of about 10 cm were injection molded at a cylinder temperature of 265° C. and a temperature of the mold of 140° C. The total injection cycle was 60 seconds. The residence time in the mold was chosen in such a manner that the ejector pins did no longer penetrate into the molded articles when the mold was opened. The injection molded articles had excellent surface properties, were free from flashes and had a density of 1.374 g./cc.

When, instead of lithium montanate, an unbranched paraffin was added having a flow point of 114° to 118° C., the injection cycle had to be prolonged to 95–100 seconds. The injection molded articles obtained had a slightly corrugated surface, they were free from flashes and had a density of 1.374 g./cc.

EXAMPLE 4

Granules of polyethylene terephthalate having a content of 0.15 percent of 1,1,4,4-tetramethylolcyclohexane, calculated on the dimethylol terephthalate used, a moisture content of less than 0.01 percent and a reduced specific viscosity of 1.40 dl./g. were subjected to rotation for 1 hour with 0.6 percent of aluminum silicate. The coated granules were homogenized in an extruder at a temperature of 275°, the melt was extruded into water in the form of a wire and granulated. The granules were dried until the moisture content had dropped below 0.01 percent and heated for 7 to 8 hours at 240° C. under a pressure of 0.4 mm. of mercury until the reduced specific viscosity was 1.4 dl./g. The granules were then coated with 0.2 percent of a partially esterified calcium montanate obtained from montan acid by esterification with 0.75 equivalent of butanediol-(1,3) and subsequent neutralization with calcium oxide.

With the granules obtained program control dials having a diameter of 10 cm. were injection molded at a cylinder temperature of 265° C. and a mold temperature of 140° C. The total injection cycle was 60 seconds. The residence time in the mold was adjusted in such a manner that the ejector pins did just not penetrate into the molded article when the mold was opened. The molded articles had excellent surface properties, they were free from flow skins and had a density of 1.375 g./cc.

When, instead of the partially esterified calcium montanate, an unbranched paraffin having a flow point of 114° to 118° was used, the injection cycle had to be prolonged to 100–105 seconds. The surface of the injection molded articles was not entirely smooth, the articles were free from flashes and had a density of 1.375 g./cc.

EXAMPLE 5

Granules of polyethylene terephthalate having a moisture content of less than 0.01 percent and a reduced specific viscosity of 1.40 dl./g., measured with a 1 percent solution in a 60:40 of phenol and tetrachloroethane at 25° C., were rolled for 1 hour together with 0.6 percent of sodium-aluminum silicate. The coated granules were homogenized in an extruder at a temperature of 275° C., the melt was extruded into water in the form of a wire and granulated. The granules were again dried until the moisture content had dropped below 0.01 percent and heated for 6–8 hours at 240° C. under a pressure of 0.4 mm. of mercury until the reduced specific viscosity was 1.4 dl./g. The granules were then coated with 0.2 percent of montan acid which had been partially neutralized with 0.25 equivalent of sodium hydroxide.

With the granules program control dials having a diameter of about 10 cm. were injection molded at a cylinder temperature of 265° C. and a temperature of the mold of 140° C. The total injection cycle was 90 seconds. The residence time in the mold was chosen in such a manner that the ejector pins did no longer penetrate into the molded articles when the mold was opened. The articles had excellent surface properties. They had slight flashes and a density of 1.375 g./cc. The reduced specific viscosity of the injection molded articles was 1.20 dl./g., measured with a 1 percent solution in a 60:40 mixture of phenol and tetrachloroethane at 25° C. When, instead of partially neutralized montan acid, sodium montanate was used, the articles had a reduced specific viscosity of 1.05 dl./g.

EXAMPLE 5a (comparative example)

Polyethylene terephthalate was produced under the usual polycondensation conditions with addition of 0.6 percent of sodium-aluminum silicate and 0.2 percent of montan acid which had been partially neutralized with 0.25 equivalent of sodium hydroxide.

A colorless polyester having a reduced specific viscosity of 0.88 dl./g., measured with a 1 percent solution in a 60:40 mixture of phenol and tetrachloroethane at 25° C. was obtained.

The polyester granules were dried for 6 hours in an eccentric tumbling drier at 180° C. under reduced pressure and then subjected to after-condensation in the solid phase for 6 hours at 240° C. under a pressure of 0.4 mm. of mercury. The after-condensed polyester had a reduced specific viscosity of 1.45 dl./g. The granules were used to manufacture program control dials having a diameter of about 10 cm. at a cylinder temperature of 265° C. and a temperature of the mold of 140° C. The control dials could be removed from the mold without too great a difficulty only after a total injection cycle of approximately 240° seconds. Even after this long cycle the ejector pins penetrated a little into the molded articles. The surface of the dials was very corrugated and distorted and slight flashes were formed. The articles had a density of 1.360 g./cc.

Although in this comparative example the same additives as in example 5 were added, the crystallization speed was so slow that the granules could not be injection molded within an economically tolerable period of time.

EXAMPLE 6

Polyethylene terephthalate granules having a moisture content of less than 0.01 percent and a reduced specific viscosity of 1.4 dl./g. were rolled for 1 hour together with 0.6 percent of calcium-magnesium carbonate, 75 percent of which had a particle size of less than 2 microns, and 0.1 percent of butane-diol diglycidyl ether.

The coated granules were homogenized in an extruder at a temperature of 275° C., the molten composition was extruded into water in the form of a wire and granulated. The granules were again dried until the moisture content had dropped to less than 0.01 percent and the reduced specific viscosity was raised to 1.4 dl./g. by heating the granules for 7 to 8 hours at 240° C. under a pressure of 0.4 mm. of mercury. The granules were then coated with 0.2 percent by weight of montan acid which had been partially neutralized with 0.50 equivalent of sodium hydroxide.

With the granules program control dials having a diameter of about 10 cm. were injection molded at a cylinder temperature of 265° C. and a temperature of the mold of 140° C. The total injection cycle was 55 seconds. The residence time in the mold was chosen in such a manner that the ejector pins did not penetrate into the dials when the mold was opened. The injection molded articles had excellent surface properties, were free from flashes, had a density of 1.376 g./cc. and a reduced specific viscosity of 1.15 dl./g.

When, instead of the montan acid neutralized with 0.50 equivalent of sodium hydroxide, sodium montanate was added, the injection molded article had a reduced specific viscosity of 1.05 dl./g.

EXAMPLE 7

Granules of polyethylene terephthalate having a content of 0.1 percent of pentaerythritol, calculated on the dimethylol terephthalate used, a moisture content of less than 0.01 percent and a reduced specific viscosity of 1.40 dl./g. were rolled for 1 hour with 0.6 percent of talc. The coated granules were homogenized in an extruder at a temperature of 275° C., the melt was extruded into water in the form of a wire and granulated. The granules were dried until the moisture content dropped below 0.01 percent and heated for 7 to 8 hours at 240° C. under a pressure of 0.4 mm. of mercury to raise the reduced specific viscosity to 1.4 dl./g. The granules were then coated with 0.25 percent of montan acid which had been partially neutralized with 0.75 equivalent of potassium hydroxide.

With the granules obtained program control dials having a diameter of about 10 cm. were injection molded at a cylinder temperature of 265° C. and a temperature of the mold of 140° C. The total injection cycle was 60 seconds. The residence time in the mold was chosen in such a manner that the ejector pins did no longer penetrate into the articles. The molded articles had excellent surface properties, they were free from flashes and had a density of 1.374 g./cc. The reduced specific viscosity of the injection molded articles was found to be 1.15 dl./g.

When instead of montan acid neutralized with 0.75 equivalent of potassium hydroxide, potassium montanate was added, the injection molded articles had a reduced specific viscosity of 1.05 dl./g.

What is claimed is:

1. A composition consisting essentially of granules of a saturated linear polyester containing
   a. 0.05 to 3 percent by weight, calculated on the polyester, of an inert inorganic solid having a particle size of less than 5 microns, and
   b. 0 to 2 percent by weight, calculated on the polyester, of a polyfunctional epoxide of the general formula

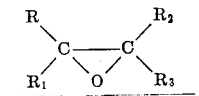

in which $R$, $R_1$, $R_2$ and $R_3$ stand for hydrogen, alkyl, cycloalkyl, aryl or aralkyl groups, which may be linked to one another with formation of ring structures and may contain ether or ester groupings, in each case at least one of the substituents carrying a further epoxide grouping, said granules having a moisture content below 0.01 percent by weight and a reduced specific viscosity of at least 1.4 dl./g., measured with a 1 percent polymer solution in a 60:40 mixture of phenol and tetrachloroethane at 25° C., said granules being coated with
   c. 0.01 to 1 percent by weight, calculated on the polyester, of a salt of a montan wax, a montan wax ester or a montan acid partially neutralized with an alkali metal hydroxide or alkali metal oxide.

2. The composition of claim 1 wherein the polyester is mixed with 0.6 to 1.0 percent by weight of an inert inorganic solid having a particles size of less than 5 microns.

3. The composition of claim 1 wherein the polyester is mixed with 0.05 to 0.03 percent by weight of a polyfunctional epoxide.

4. The composition of claim 1 wherein the polyester is coated with 0.05 to 5 percent by weight, calculated on the polyester, of a montan wax salt, a salt of a montan wax ester or of a montan wax acid partially neutralized with 0.1 to 0.9 equivalent of alkali metal hydroxide or alkali metal oxide.

5. The composition of claim 1, wherein the polyester is coated with 0.15 to 0.25 percent by weight, calculated on the polyester, of a montan wax salt, a salt of a montan wax ester or of a montan wax acid partially neutralized with 0.1 to 0.9 equivalent of alkali metal hydroxide or alkali metal oxide.

6. The composition of claim 1, wherein the saturated linear polyester is polyethylene glycol terephthalate.

7. The composition of claim 1, wherein the saturated linear polyester is polycyclohexane-1,4-dimethylol terephthalate.

8. The composition of claim 1 wherein the inert inorganic solid is selected from the group consisting of a metal oxide, an alkaline earth metal salt, a silicate or glass powder.

9. The composition of claim 8, wherein the inert inorganic solid is sodium-aluminum silicate or calcium-magnesium carbonate.

10. The composition of claim 1 wherein the polyfunctional epoxide is an alkylene-polyol glycidyl ether.

11. The composition of claim 10, wherein the epoxide is butanediol-1,4 diglycidyl ether.

12. The composition of claim 1 wherein the polyester granules are coated with a neutral or partially neutralized sodium salt of montanates.

* * * * *

UNITED STATES PATENT OFFICE
CERTIFICATE OF CORRECTION

Patent No. 3,632,402                    Dated January 4, 1972

Inventor(s) Weissermel and Kern

It is certified that error appears in the above-identified patent and that said Letters Patent are hereby corrected as shown below:

In the Heading:

After "P 17 69 224.9" insert --and

September 11, 1968, Germany, P 17 94 114.9--.

Signed and sealed this 2nd day of May 1972.

(SEAL)
Attest:

EDWARD M. FLETCHER, JR.
Attesting Officer

ROBERT GOTTSCHALK
Commissioner of Patents